(12) United States Patent
Wu et al.

(10) Patent No.: US 11,411,484 B2
(45) Date of Patent: Aug. 9, 2022

(54) THIN DISPLACEMENT DRIVING DEVICE

(71) Applicant: Intelligent Mechatronics Industry Co., Ltd., Taoyuan (TW)

(72) Inventors: Tso-Hsiang Wu, Taoyuan (TW); Chi-Wei Chiu, Taoyuan (TW)

(73) Assignee: INTELLIGENT MECHATRONICS INDUSTRY CO., LTD., Taoyuan (TW)

( * ) Notice: Subject to any disclaimer, the term of this patent is extended or adjusted under 35 U.S.C. 154(b) by 41 days.

(21) Appl. No.: 17/132,179

(22) Filed: Dec. 23, 2020

(65) Prior Publication Data

US 2021/0203215 A1 Jul. 1, 2021

(30) Foreign Application Priority Data

Dec. 27, 2019 (TW) ................................ 108148048

(51) Int. Cl.
*H02K 41/02* (2006.01)
(52) U.S. Cl.
CPC .................... *H02K 41/02* (2013.01)
(58) Field of Classification Search
CPC .................................................. H02K 41/02

USPC ................ 310/12.01, 12.04, 12.07, 12.08
See application file for complete search history.

(56) References Cited

U.S. PATENT DOCUMENTS

| | | | |
|---|---|---|---|
| 4,742,255 A * | 5/1988 | Nakagawa | F16C 29/04 |
| 5,245,232 A * | 9/1993 | Nihei | H02P 6/34 |
| | | | 310/12.08 |
| 2018/0213137 A1* | 7/2018 | Park | H04N 5/238 |

* cited by examiner

*Primary Examiner* — Jose A Gonzalez Quinones
(74) *Attorney, Agent, or Firm* — McClure, Qualey & Rodack, LLP

(57) ABSTRACT

A thin displacement driving device includes a first movable plate, a second movable plate, an axial limiting unit, a first actuator and a second actuator. The axial limiting unit limits the moving direction of the first movable plate and the second movable late. The first actuator has a first shape memory alloy wire coupled to the first movable plate, and the second actuator has a second shape memory alloy wire coupled to the second movable plate. Movement of the first movable plate by the actuation of the first actuator will trigger movement of the second movable plate, and movement of the second movable plate by actuation of the second actuator will trigger movement of the first movable plate.

10 Claims, 10 Drawing Sheets

THIN DISPLACEMENT DRIVING DEVICE

CROSS REFERENCE TO RELATED APPLICATIONS

This Non-provisional application claims priority under 35 U.S.C. § 119(a) on Patent Application No. 108148048 filed in Taiwan on Dec. 27, 2019, the entire contents of which are hereby incorporated by reference.

BACKGROUND

1. Technical Field

The invention relates to a displacement driving device and, in particular, to a thin displacement driving device.

2. Description of Related Art

Technological advances have made the components of electronic products at present as miniaturized as possible, nowadays, the most common function in electronic devices is image pickup, which is usually used as a flash or fill-in light through the combination of camera module and light-emitting components.

In generally, the camera module and the light-emitting components are disposed on the enclosure of an electronic device (such as a mobile phone, a tablet computer, etc.) in an exposed design. Taking the camera module of mobile phone as an example, it is usually divided into rear camera and front camera, among which the front one is that on the same side as the display surface and usually arranged above the display surface. However, mobile phones or tablet computers tend to be designed as full screen, so the front-facing camera will become an obstacle to this kind of design and increase the difficulty thereof.

One of the methods is to store the camera module into the mobile phone and expose it when needed. However, mobile phones or tablet computers are thin design that is not suitable to use driving components such as motor.

As described above, it is an important subjective to provide a thin displacement driving device that can perform displacement driving in a narrow or thin space to move an object such as a camera or a light-emitting component.

SUMMARY OF THE INVENTION

In view of the foregoing, the invention is to provide a thin displacement driving device that can drive the movement of an object in a narrow or thin space.

To achieve the above, a thin displacement driving device is provided that can be used to couple and drive an object. The thin displacement driving device includes a first movable plate, a second movable plate, an axial limiting unit, a first actuator and a second actuator. The first movable plate is provided with a first fixing part, which is coupled with the object to be driven through an extension part. The second movable plate is disposed on the first movable plate and is provided with a second fixing part. The axial limiting unit is coupled with the first movable plate and the second movable plate respectively to make the first movable plate move along the first axial and the second movable plate move along the second axial different from the first axial. The first actuator is disposed on one side of the first movable plate and has a first electrode terminal pair and a first shape memory alloy (SMA) wire. The two ends of the first SMA wire are respectively connected to the electrodes of the first electrode terminal pair, and the middle section of the first SMA wire is connected to the first fixing part of the first movable plate. The second actuator is disposed on one side of the second movable plate and has a second electrode terminal pair and a second SMA wire. The two ends of the second SMA wire are respectively connected to the electrodes of the second electrode terminal pair, and the middle section of the second SMA wire is connected to the second fixing part of the second movable plate. Movement of the first movable plate by the actuation of the first actuator will trigger movement of the second movable plate, and movement of the second movable plate by actuation of the second actuator will trigger movement of the first movable plate.

In one embodiment, the thin displacement driving device includes a first substrate and a second substrate. The first substrate is disposed on one side of the first movable plate, and the first electrode terminal pair of the first actuator is arranged on the first substrate. The second substrate is disposed on one side of the second movable plate, and the second electrode terminal pair of the second actuator is arranged on the second substrate.

In one embodiment, the thin displacement driving device includes a first elastic unit and a second elastic unit. The first elastic unit is disposed between the first substrate and the first movable plate to provide a first restoring force for the first movable plate. The second elastic unit is disposed between the second substrate and the second movable plate to provide a second restoring force for the second movable plate.

In one embodiment, the axial limiting unit is provided with four limiting components, which are respectively disposed at the four corners of the overlap area of the first movable plate and the second movable plate in the forward projection direction.

In one embodiment, the thin displacement driving device includes a limiting structure that has a positioning part and an irregular opening, which are respectively arranged on the first movable plate and the second movable plate, and the irregular opening limits the moving range of the positioning part. The positioning part is connected to the first movable plate, and the irregular opening is in the second movable plate.

In one embodiment, the irregular opening is provided with a first fixing part, a second fixing part, a guiding part and a stop part. The stop part and the guiding part are disposed in opposite position and between the first fixing part and the second fixing part.

As mentioned above, the thin displacement driving device is to use flat-shaped first movable plate and second movable plate, cooperating with the actuator composed of SMA wire, to drive the movable plate and then actuate the extension part to trigger the displacement of the object.

The detailed technology and preferred embodiments implemented for the subject invention are described in the following paragraphs accompanying the appended drawings for people skilled in this field to well appreciate the features of the claimed invention.

BRIEF DESCRIPTION OF THE DRAWINGS

The parts in the drawings are not necessarily drawn to scale, the emphasis instead being placed upon clearly illustrating the principles of at least one embodiment. In the drawings, like reference numerals designate corresponding parts throughout the various diagrams, and all the diagrams are schematic.

DETAILED DESCRIPTION

Reference will now be made to the drawings to describe various inventive embodiments of the present disclosure in detail, wherein like numerals refer to like elements throughout.

Figure 1:
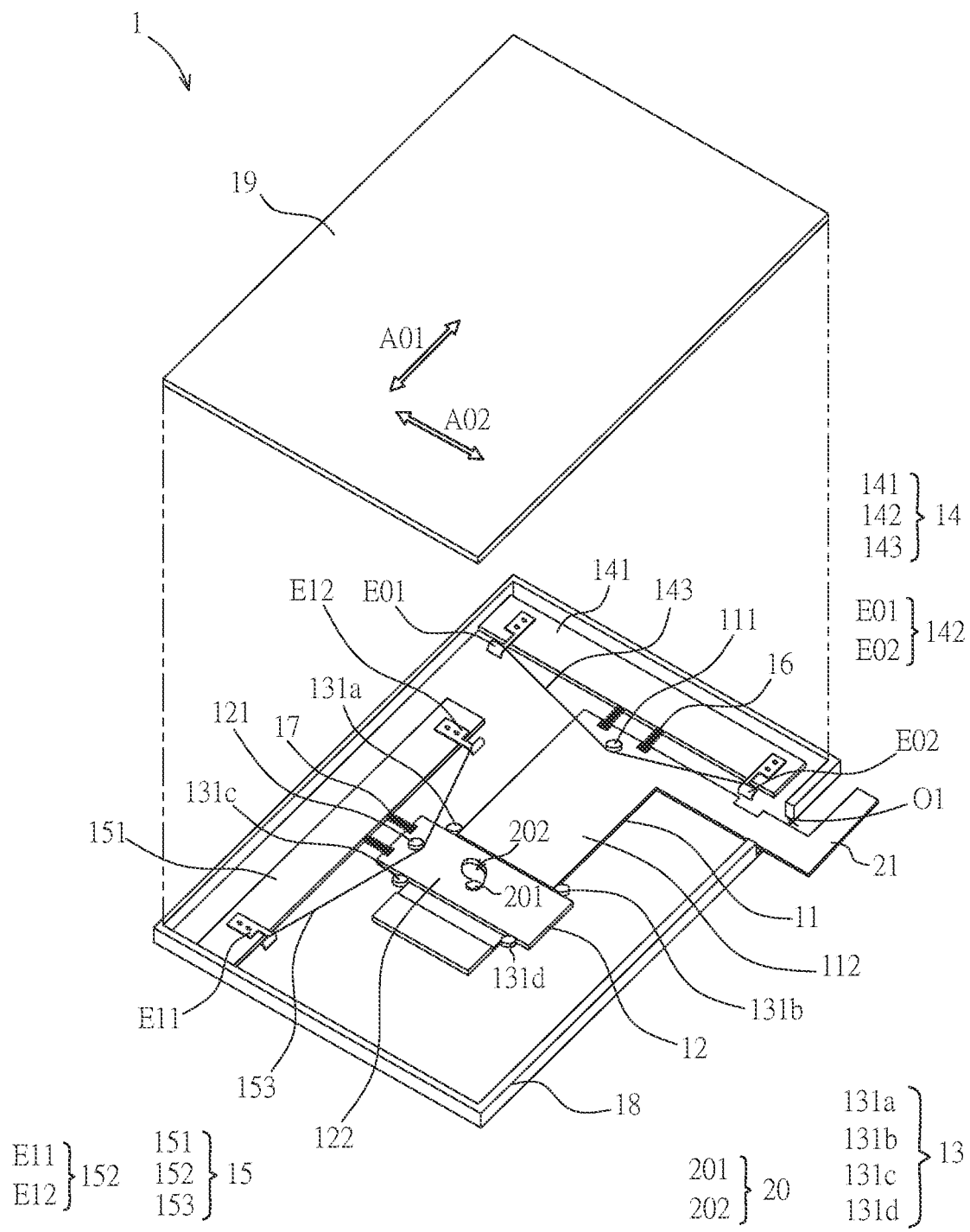
FIG. 1 is a schematic illustration showing the structure of a thin displacement driving device according to an embodiment of the invention.

Referring to FIG. 1, a thin displacement driving device 1 according to a first embodiment of the invention includes a first movable plate 11, a second movable plate 12, an axial limiting unit 13, a first actuator 14, a second actuator 15, a first elastic unit 16, a second elastic unit 17, a base 18 and an upper cover 19.

The first movable plate 11 is in a rectangle flat shape and is provided with a first fixing part 111 on a surface 112. In the present embodiment, one side edge of the first movable plate 11 is connected with an extension part 21 and then coupled with an object to be driven (not shown in the figure). The object may include, but is not limited to, an object to be moved, such as a camera module, a light-emitting unit, a display unit or a button.

The second movable plate 12 is in a rectangular flat shape and is provided with a second fixing part 121 on a surface 122. The second movable plate 12 is disposed on the first movable plate 11, which can contact the surface 112 of the first movable plate 11, and can also be separated by a distance from the surface 112 of the first movable plate 11.

The axial limiting unit 13 is coupled with the first movable plate 11 and the second movable plate 12 respectively to limit the moving direction of the first movable plate 11 and the second movable plate 12, and to prevent their rotation. In the present embodiment, the axial limiting unit 13 has four cylindrical or pie plate limiting components 131a, 131b, 131c and 131d, which are located at four corners outside the overlap area of the first movable plate 11 and the second movable plate 12 in the forward projection direction. The first movable plate 11 is moved along a first axial A01 and the second movable plate 12 is moved along a second axial A02 by the axial limiting unit 13. Therefore, the first axial A01 is different from the second axial A02, which have a 90 degrees angle difference in this embodiment.

The first movable plate 11 and the second movable plate 12 mentioned above take the rectangular flat shape as an example, however, they can also be of other shapes in other embodiments. Of course, in the case of non-rectangular design, the axial limiting unit must also be changed accordingly, or it can limit the axial movement by the cooperation of the groove and the convex part, which is not restricted here.

Please continue to refer to FIG. 1, the first actuator 14 is disposed on one side of the first movable plate 11 along the first axial A01, which is provided with a first substrate 141, a first electrode terminal pair 142 and a first SMA wire 143. The first electrode terminal pair 142 are respectively arranged on the first substrate 141. The two ends of the first SMA wire 143 are respectively connected to the electrodes E01 and E02 of the first electrode terminal pair 142, while the middle section of the first SMA wire 143 is connected to one side of the first fixing part 111 of the first movable plate 11 far away from the first actuator 14.

The second actuator 15 is disposed on one side of the second movable plate 12 along the second axial A02, which is provided with a second substrate 151, a second electrode terminal pair 152 and a second SMA wire 153. The second electrode terminal pair 152 are respectively arranged on the second substrate 151. The two ends of the second SMA wire 153 are respectively connected to the electrodes E11 and E12 of the second electrode terminal pair 152, while the middle section of the second SMA wire 153 is connected to one side of the second fixed part 121 of the second movable plate 12 far away from the second actuator 15.

In the present embodiment, the first substrate 141 and the second substrate 151 are respectively a printed circuit board, which may have a circuit pattern and be provided with electronic components (including active or passive components) to provide driving current to the first electrode terminal pair 142 and the second electrode terminal pair 152 to actuate the first SMA wire 143 and the second SMA wire 153. Each SMA wire shrinks with thermal deformation caused by electric current and then drive the movement of movable plates.

The first elastic unit 16 is disposed between the first substrate 141 and the first movable plate 11 to provide a force acting on the first movable plate 11. The second elastic unit 17 is disposed between the second substrate 151 and the second movable plate 12 to provide a force acting on the second movable plate 12. In the present embodiment, the first elastic unit 16 and the second elastic unit 17 may be, but are not limited to, compression springs or extension springs.

The base 18 and the upper cover 19 jointly form an accommodating space to hold or fix the first movable plate 11, the second movable plate 12, the axial limiting unit 13, the first actuator 14, the second actuator 15, the first elastic unit 16 and the second elastic unit 17. An opening O1 is provided after the base 18 and the upper cover 19 are combined so that a part of extension part 21 can penetrates through and be exposed from the accommodating space to couple with the object to be driven.

It is to be noted that in other embodiments, the base and the upper cover may be composed of the surfaces of other components, such as printed circuit board or other components with plane, rather than independently designed components. Moreover, the base 18 and the upper cover 19 may not need to exist at the same time.

Through the above structural combination, when the first movable plate 11 is driven by the first actuator 14 to move along the first axial A01, the second elastic unit 17 will be triggered to move the second movable plate 12; when the second movable plate 12 is driven by the second actuator 15 to move along the second axial A02, the first elastic unit 16 will be triggered to move the first movable plate 11.

In order to achieve the above trigger mechanism, the thin displacement driving device 1 includes a limiting structure 20, which is provided with a positioning part 201 and an irregular opening 202. In the present embodiment, the positioning part 201 is arranged on the surface 112 of the first movable plate 11, and the irregular opening 202 is formed in the second movable plate 12. Since the second movable plate 12 is disposed on the first movable plate 11, the positioning part 201 can be disposed in the irregular opening 202, and the moving range of the positioning part 201 is limited by the irregular opening 202.

Figure 2:
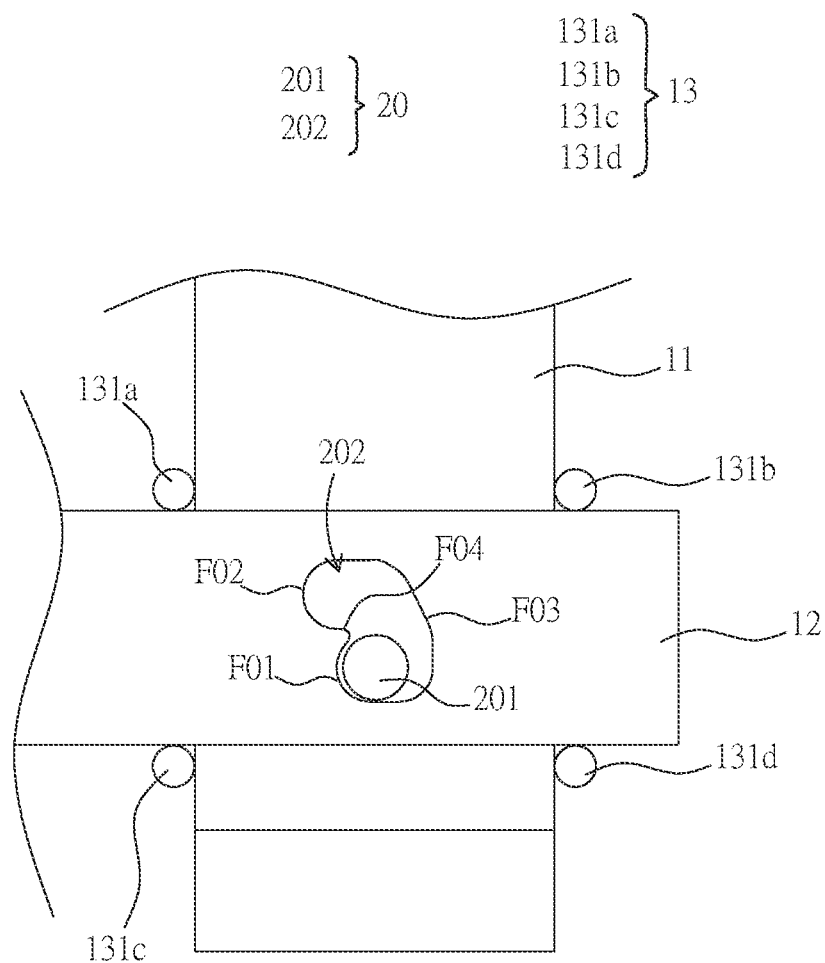
FIG. 2 is a schematic illustration showing a limiting structure of the thin displacement driving device.

Please refer to FIG. 1 and FIG. 2, the irregular opening 202 has a first fixing part F01, a second fixing part F02, a guiding part F03 and a stop part F04. The contours of the first fixing part F01 and the second fixing part F02 are corresponding to that of the positioning part 201, which can move between the first fixing part F01 and the second fixing part F02 with the movement of the first moving plate 11 and the second moving plate 12, and can be fixed when moving to the first fixing part F01 or the second fixing part F02. In the present embodiment, the contours of the first fixing part F01 and the second fixing part F02 are arc-shaped.

The stop part F04 is disposed between the first fixing part F01 and the second fixing part F02. As shown in the FIG. 2, if the first fixing part F01 and the second fixing part F02 are called "left arc", then the stop part F04 is called "right arc".

The guiding part F03 and the stop part F04 are arranged in opposite position, and the stop part F04 is also arranged between the first fixing part F01 and the second fixing part F02 to guide the positioning part 201 to move from the first fixing part F01 to the second fixing part F02. In the present embodiment, the guiding part F03 is a beveled edge, which has an included angle with the first axial A01.

Please refer to FIG. 2 and FIG. 3A to FIG. 3C for a brief illustration of the actuating mode of the thin displacement driving device 1 of the present invention. In the present embodiment, the thin displacement driving device 1 is disposed inside the mobile communication device and is coupled with a camera module (not shown in the figure), which can be stored in the mobile communication device in the initial state and can be exposed from the mobile communication device through the actuation of the thin displacement driving device 1 when it is to be used.

Figure 3A:
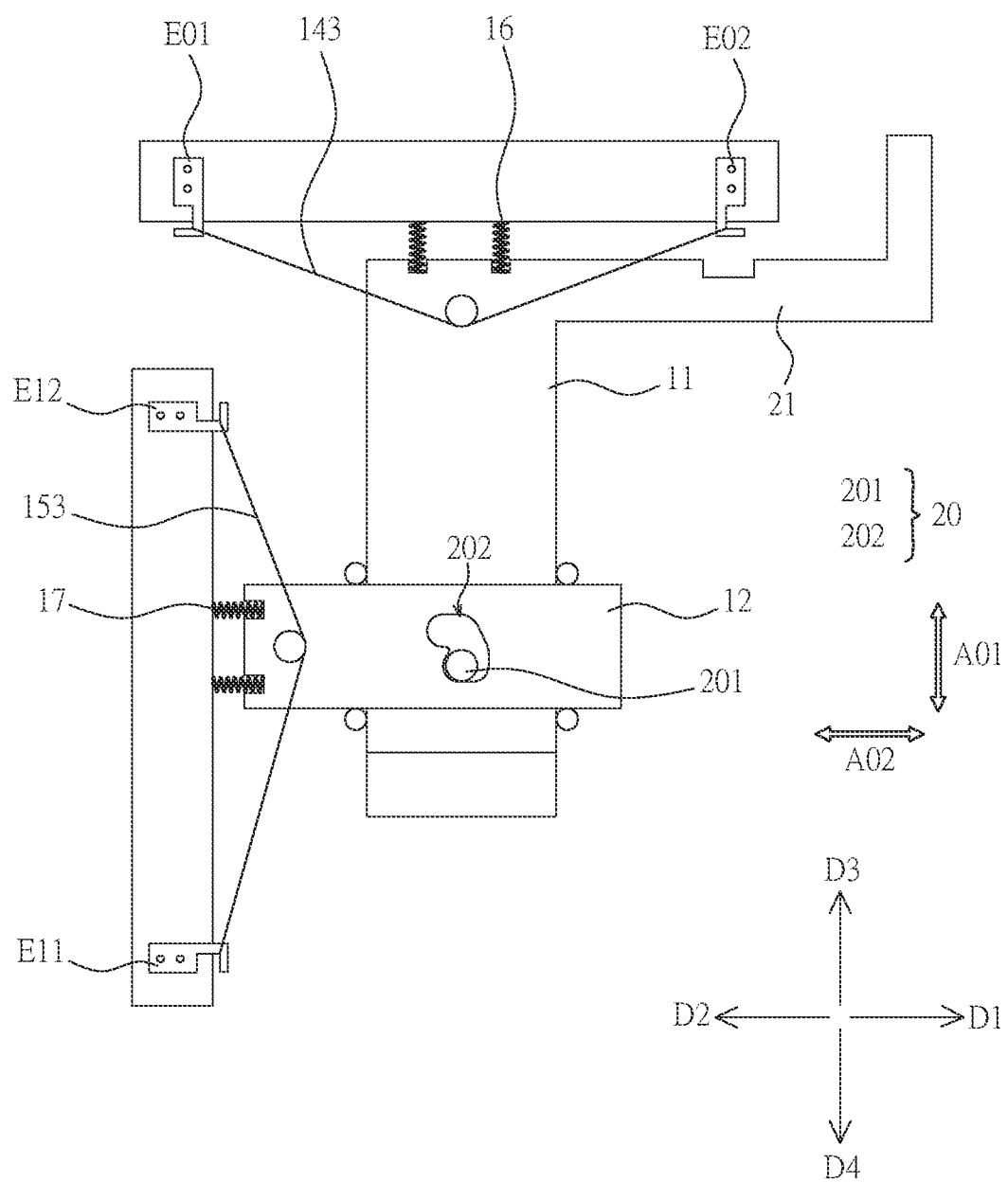
FIGS. 3A to 3C are schematic illustrations showing the action process of the thin displacement driving device.

As shown in FIG. 3A, the first SMA wire 143 and the second SMA wire 153 are in a relaxation state at the initial position without providing any acting force, the first elastic unit 16 provides a force towards a fourth direction D4 and the second elastic unit 17 provides a force towards a first direction D1 so that the positioning part 201 is fixed by the stop part F04 to the first fixing part F01.

Figure 3B:
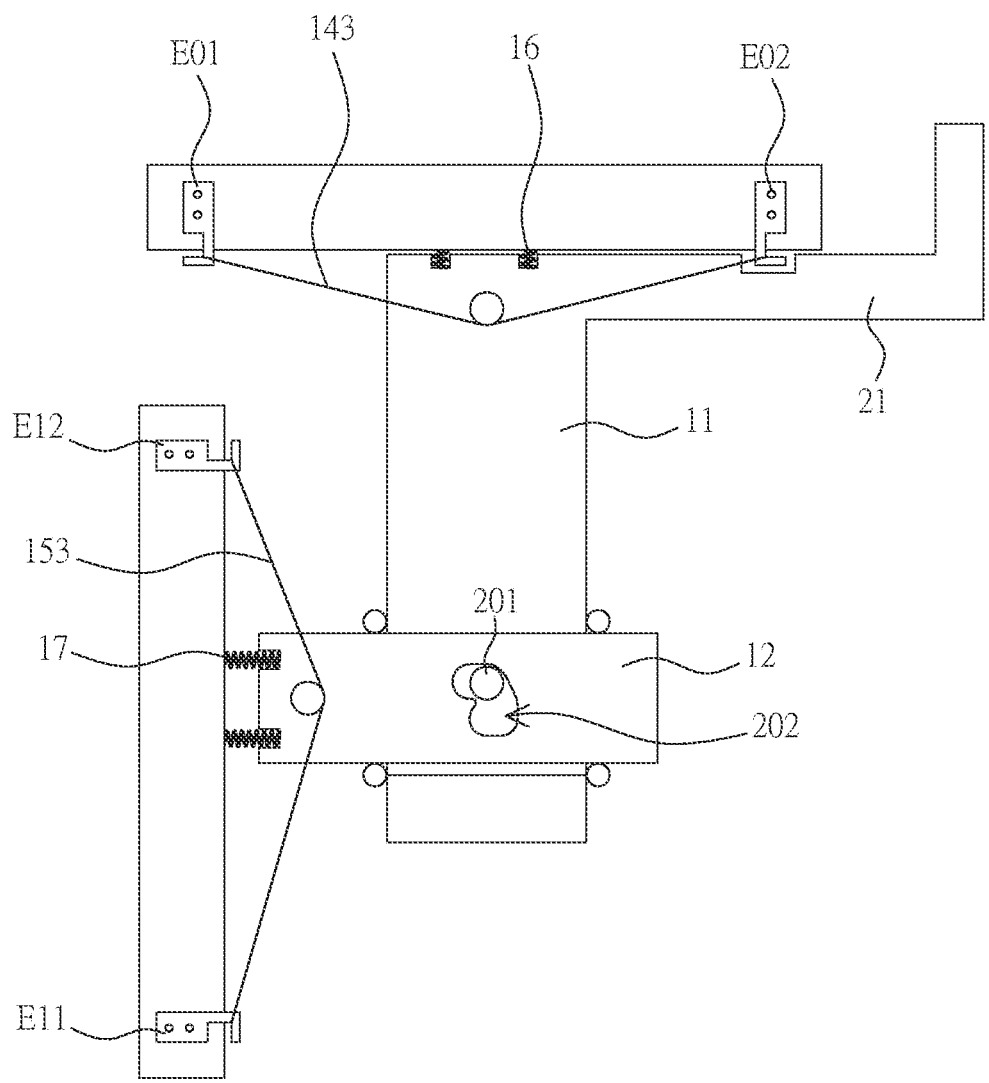

Then, as shown in FIG. 3B, the first electrode terminal pair 142 provides electric current to the first SMA wire 143 to shrink it and then generates a force towards a third direction D3. At this time, the positioning part 201 arranged on the first movable plate 11 will break away from the fixation of the first fixing part F01 and the stop part F04, and move along the guiding part F03 towards the third direction D3. And the extension part 21 connected with the first movable plate 11 can move together with the first movable plate 11 so as to drive the camera module coupled with the extension part 21.

Figure 3C:
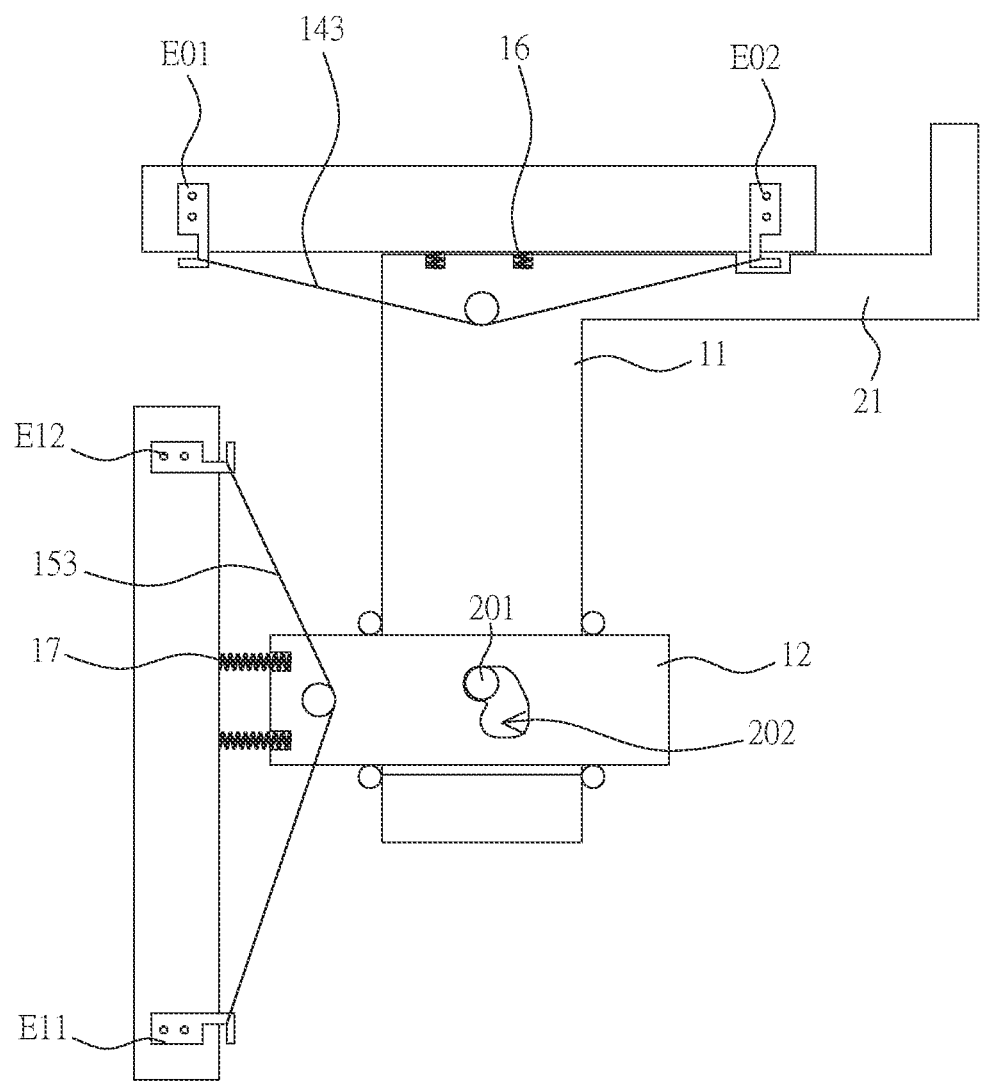

Please refer to FIG. 3B and FIG. 3C, when the positioning part 201 is completely separated from the stop part F04, the second elastic unit 17 will provide a force towards the first direction D1 to drive the second movable plate 12 to move towards the first direction D1, so that the positioning part 201 is limited by the stop part F04 and stopped at the position contacting the second fixing part F02. At this time, the electric current supply to the first electrode terminal pair 142 can be stopped and the first SMA wire 143 can be relaxed. In this way, the position of each component can be maintained without any power supply when all of them are in right place so that the power consumption can be effectively reduced.

Then, when the camera module is to be reset, the second electrode terminal pair 152 provides electric current to the second SMA wire 153 to shrink it and then generates a force towards a second direction D2, at when the second movable plate 12 will move towards the second direction D2. After the positioning part 201 is separated from the restriction of the stop part F04, the first elastic unit 16 will provide a force towards the fourth direction D4 to drive the first movable plate 11 to move towards the fourth direction D4 (the position status can also refer to FIGS. 3B and 3A). Then, the current supply to the second electrode terminal pair 152 can be stopped to relax the second SMA wire 153.

While the second SMA wire 153 is relaxed, the second elastic unit 17 will provide a force in the first direction D1 to the second movable plate 12, so that the positioning part 201 can be limited by the stop part F04 and stopped at the position contacting the first fixing part F01. As mentioned above, the position of each component can be maintained without any power supply when all of them are in right place so that the power consumption can be effectively reduced.

Figure 4A:
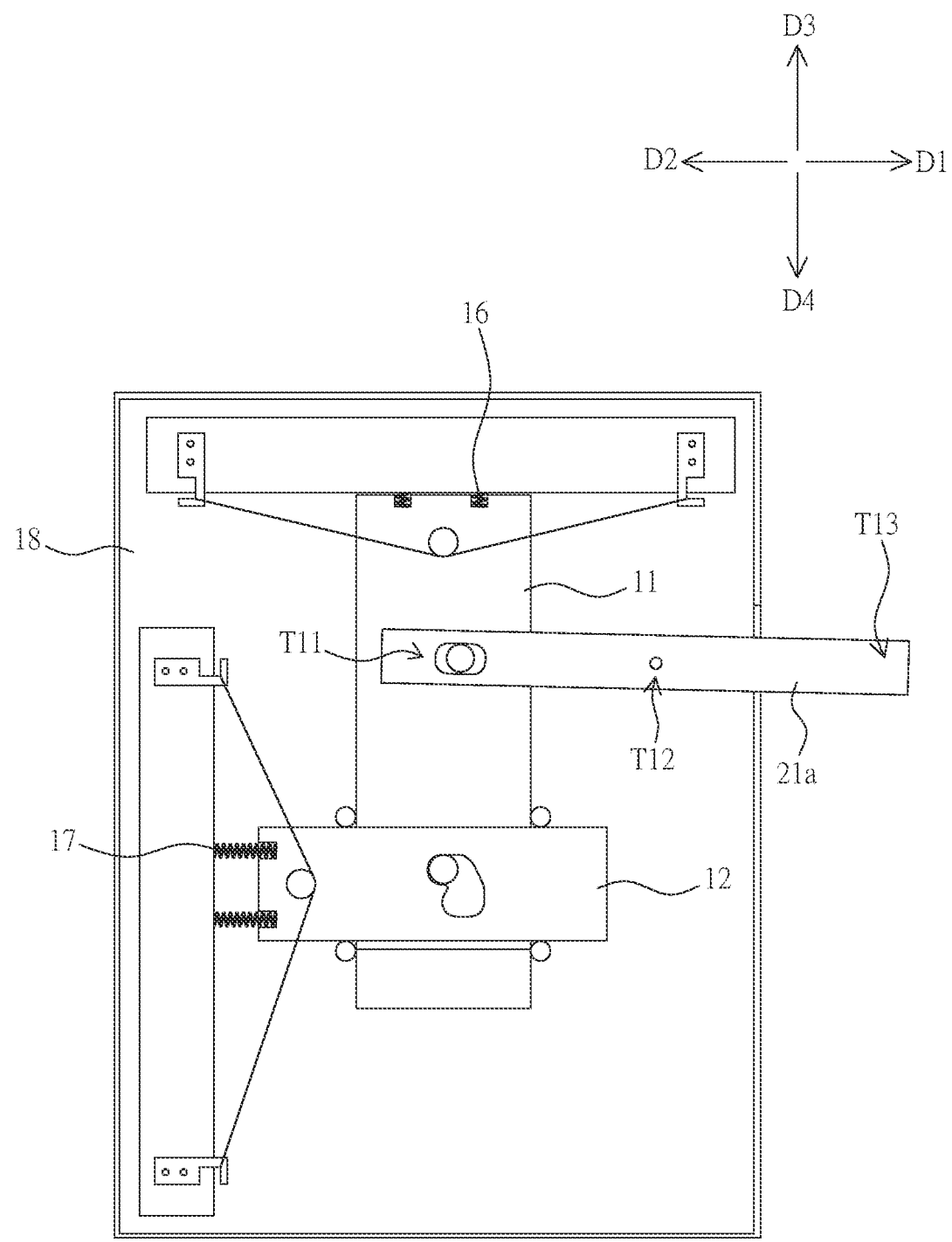
FIGS. 4A to 4B are schematic illustrations showing an extension part of the thin displacement driving device that being pivot jointed to a first movable plate.
Figure 4B:
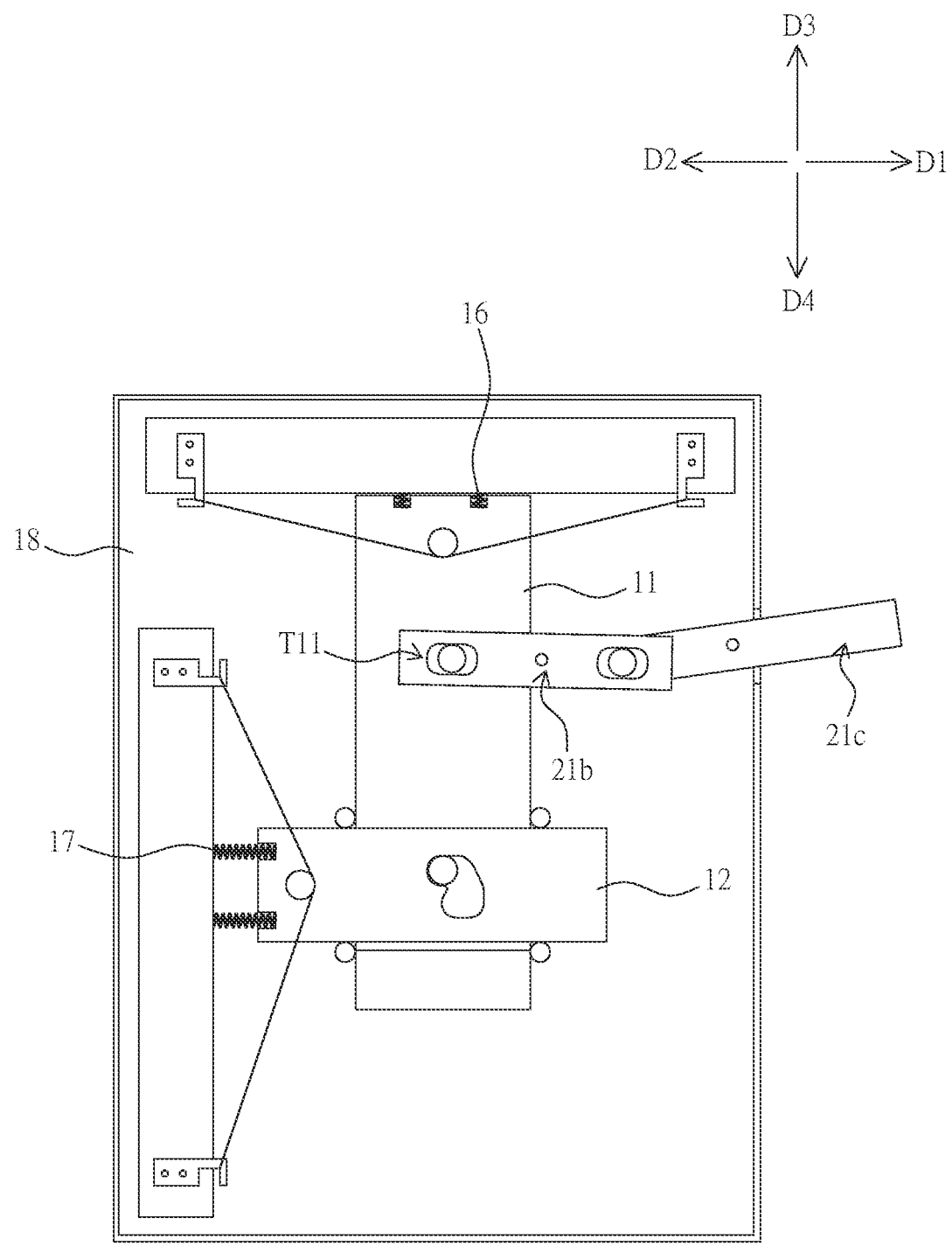

The extension part 21 is an extended part of the first movable plate 11 (or integrally formed), however, it can also have different connection modes as shown in FIG. 4A and FIG. 4B. In FIG. 4A, one end T11 of the extension part 21a is pivot jointed to the first movable plate 11, the middle section T12 of the extension part 21a is pivot jointed to the base 18, and the other end T13 of the extension part 21a is connected with the above object. Based on this structure, when the first movable plate 11 moves towards the third direction D3, the other end T13 of the extension part 21a will be driven to move towards the fourth direction D4. The structure with single connecting rod can have a different driving direction from the previous embodiment. It is worth mentioning that the middle section T12 does not only refer to the rightly middle position, which can represent any position between the two ends (T11 and T13) of the extension part 21a, but the pivot position is a fulcrum to form a lever structure. Among them, the position of fulcrum will affect the force transmission and displacement, so different positions can be designed according to actual needs.

In addition, the above-mentioned extension part can also be in the form of multi-connecting rods as shown in FIG. 4B, wherein the extension part is composed of the first extension part 21b and the second extension part 21c. One end of the first extension part 21b is pivot jointed to the first movable plate 11, the other end of the first extension part 21b is pivot jointed to one end of the second extension part 21c, and the other end of the second extension part 21c is connected to the object, and the middle sections of the first extension part 21b and the second extension part 21c are respectively pivot jointed to the base 18. Based on this structure, the object can be moved in a direction other than the first direction D1 to the fourth direction D4 after proper position arrangement. Similar to FIG. 4A, the pivot position of the first extension part 21b and the second extension part 21c to the base 18 is not limited to the middle point, which is mainly considered to form a level structure in designing.

It should be noted that in addition to the cylindrical or pie plate shaped axial limiting components described in the preceding embodiment and arranged at the four corners of the overlap area of the first movable plate and the second movable plate in the forward projection direction, there may be other embodiment aspects, such as setting the limit components inside the overlap area of the first movable plate and the second movable plate in the forward projection direction, or setting some limiting components outside the overlap area while some inside the overlap area.

Figure 5A:
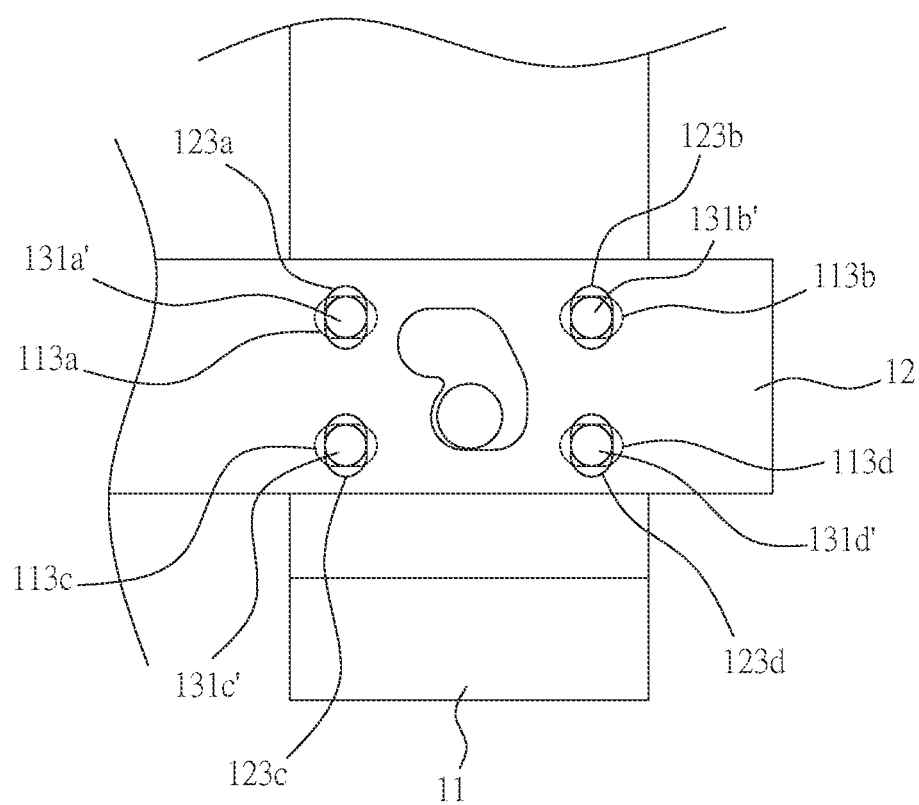
FIGS. 5A to 5C are schematic illustrations showing the location and shape of the limiting components.

As shown in FIG. 5A, it is an embodiment aspect in which the limiting components are disposed inside the overlap area of the first movable plate 11 and the second movable plate 12 in the forward projection direction. In this embodiment, the first movable plate 11 also has a first opening 113a, a second opening 113b, a third opening 113c and a fourth opening 113d. The second movable plate 12 also has a fifth opening 123a, a sixth opening 123b, a seventh opening 123c and an eighth opening 123d. Among them, the first opening 113a roughly corresponds to the fifth opening 123a, and the first limiting component 131a' drills through therein; the second opening 113b roughly corresponds to the sixth opening 123b, and the second limiting component 131b' drills through therein; the third opening 113c roughly corresponds to the seventh opening 123c, and the third limiting component 131c' drills through therein; the fourth opening 113d roughly corresponds to the eighth opening 123d, and the fourth limiting component 131d' drills through therein.

Figure 5B:
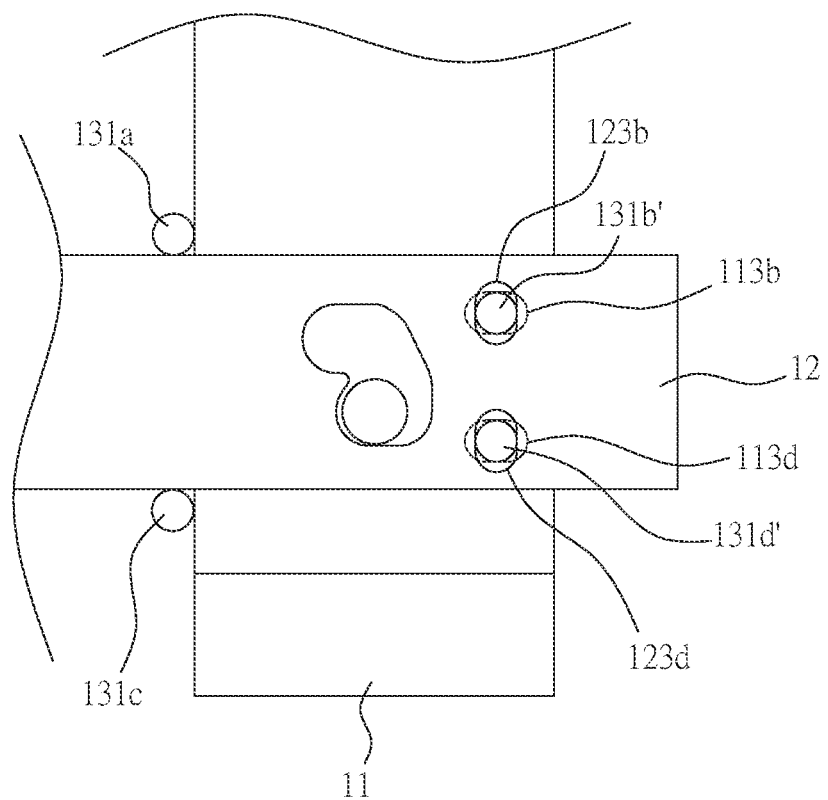

As shown in FIG. 5B, it is an embodiment in which part of the limiting components are arranged in the overlap area of the first movable plate 11 and the second movable plate 12 in the forward projection direction, while part of the limiting components are arranged outside the overlap area of the first movable plate 11 and the second movable plate 12 in the forward projection direction. In the present embodiment, the first movable plate 11 is provided with a second opening 113b and a fourth opening 113d as described above. The second movable plate 12 is provided with a sixth opening 123b and an eighth opening 123d as described above. The limiting components 131a and 131c are arranged at the corner outside the overlap area of the first movable plate 11 and the second movable plate 12 in the forward projection direction; The second opening 113b roughly corresponds to the sixth opening 123b, and the second limiting component 131b' drills through therein; the fourth opening 113d roughly corresponds to the eighth opening 123d, and the fourth limiting component 131d' drills through therein.

Figure 5C:
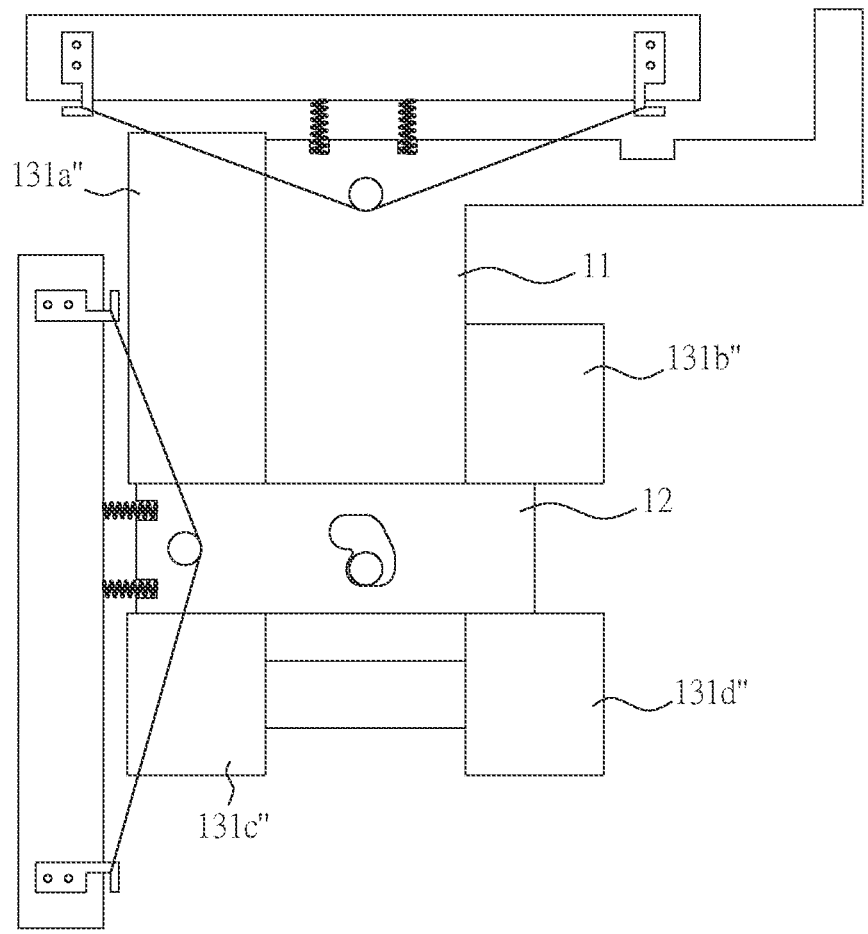

Finally, please refer to FIG. 5C, the limiting component is not limited to cylindrical or pie plate shape, which can also be a block shape as limiting components 131a'', 131b'', 131c'', 131d'' in this embodiment. The block-shape limiting components 131a'', 131b'', 131c'' and 131d'' are arranged outside the overlap area of the first movable plate 11 and the second movable plate 12 in the forward projection direction to form a structure such as an orbit, so that the first movable plate 11 and the second movable plate 12 can move between the limiting units. Of course, the block-shape limiting components can also be combined with the above embodiments for more aspects, which will not be described here.

As mentioned above, the thin displacement driving devices of the present invention is to use the first movable plate and the second movable plate in a flat shape together with the actuator composed of SMA wire to actuate the movement of the movable plates, so as to drive the extension part. Therefore, the displacement driving device can be thinner and more miniaturized without motor and other driving devices, and can be applied widely to more portable electronic devices. Moreover, the position of object can be self-held when it is driven by the displacement driving device to a fixed point, and power supply is no longer needed to maintain the position. Therefore, the power consumption of the device or system can also be reduced so as to achieve the purpose of energy saving.

Even though numerous characteristics and advantages of certain inventive embodiments have been set out in the foregoing description, together with details of the structures and functions of the embodiments, the disclosure is illustrative only. Changes may be made in detail, especially in matters of arrangement of parts, within the principles of the present disclosure to the full extent indicated by the broad general meaning of the terms in which the appended claims are expressed.

What is claimed is:

1. A thin displacement driving device, which is to couple and drive an object, comprising:
    a first movable plate, which has a first fixing part coupled with the object to be driven through an extension part;
    a second movable plate, which has a second fixing part;
    an axial limiting unit, which is coupled with the first movable plate and the second movable plate respectively to make the first movable plate move along the first axial and the second movable plate move along the second axial different from the first axial;
    a first actuator, which is disposed on one side of the first movable plate and has a first electrode terminal pair and a first shape memory alloy wire, wherein the two ends of the first shape memory alloy wire are respectively connected to the electrodes of the first electrode terminal pair, and the middle section of the first shape memory alloy wire is connected to the first fixing part of the first movable plate; and
    a second actuator, which is disposed on one side of the second movable plate and has a second electrode terminal pair and a second shape memory alloy wire, wherein the two ends of the second shape memory alloy wire are respectively connected to the electrodes of the second electrode terminal pair, and the middle section of the second shape memory alloy wire is connected to the second fixing part of the second movable plate;
    wherein movement of the first movable plate by the actuation of the first actuator will trigger movement of the second movable plate, and movement of the second movable plate by actuation of the second actuator will trigger movement of the first movable plate.

2. The thin displacement driving device of claim 1, wherein the first actuator further has a first substrate and the second actuator further has a second substrate, the first electrode terminal pair of the first actuator is arranged on the first substrate and the second electrode terminal pair of the second actuator is arranged on the second substrate.

3. The thin displacement driving device of claim 2, further comprising:
    a first elastic unit, which is disposed between the first substrate and the first movable plate to provide a first restoring force for the first movable plate; and
    a second elastic unit, which is disposed between the second substrate and the second movable plate to provide a second restoring force for the second movable plate.

4. The thin displacement driving device of claim 1, wherein the axial limiting unit is provided with four limiting components, which are respectively disposed at the four corners of the overlap area of the first movable plate and the second movable plate in the forward projection direction.

5. The thin displacement driving device of claim 1, further comprising:
    a limiting structure, which has a positioning part and an irregular opening, which are respectively arranged on the first movable plate and the second movable plate, and the irregular opening limits the moving range of the positioning part.

6. The thin displacement driving device of claim 5, wherein the positioning part of the limiting structure is connected to the first movable plate, and the irregular opening is in the second movable plate.

7. The thin displacement driving device of claim 5, wherein the irregular opening comprising:
   a first fixing part;
   a second fixing part;
   a guiding part; and
   a stop part, which disposed in opposite to the guiding part and between the first fixing part and the second fixing part.

8. The thin displacement driving device of claim 1, wherein the extension part is pivot jointed to the first movable plate or extended from the first movable plate.

9. The thin displacement driving device of claim 1, further comprising:
   an accommodating space, which is to hold first movable plate, the second movable plate, the axial limiting unit, the first actuator and the second actuator.

10. The thin displacement driving device of claim 9, wherein a part of extension part is penetrated through and be exposed from the accommodating space.

\* \* \* \* \*